United States Patent [19]

Dalglish

[11] Patent Number: 4,939,439

[45] Date of Patent: Jul. 3, 1990

[54] ROBOT VISION AND OPTICAL LOCATION SYSTEMS

[75] Inventor: Robert L. Dalglish, Abbotsford, Australia

[73] Assignee: Unisearch Limited, Kensington, Australia

[21] Appl. No.: 239,080

[22] Filed: Sep. 1, 1988

Related U.S. Application Data

[63] Continuation of Ser. No. 905,164, Sep. 9, 1986, abandoned.

[30] Foreign Application Priority Data

Sep. 26, 1985 [AU] Australia .............................. PH02632

[51] Int. Cl.$^5$ ................................................ G06F 7/48
[52] U.S. Cl. .................................. 318/568.1; 364/513; 364/731; 901/47; 318/567; 318/568.16; 358/37; 358/75
[58] Field of Search ................................. 318/565-572, 318/632, 573; 364/513, 731; 358/125, 126, 212, 210, 160, 211, 134, 11, 75; 901/9, 16, 33, 47, 46; 340/728; 342/93

[56] References Cited

U.S. PATENT DOCUMENTS

| | | | |
|---|---|---|---|
| 3,940,762 | 2/1976 | Ethington et al. | 342/93 X |
| 4,281,342 | 7/1981 | Ueda et al. | 901/47 X |
| 4,309,618 | 1/1982 | Carter et al. | 901/46 X |
| 4,373,804 | 2/1983 | Pryor et al. | 901/47 X |
| 4,375,649 | 3/1983 | Mir et al. | 358/75 |
| 4,396,945 | 8/1983 | DiMatteo et al. | 901/47 X |
| 4,419,011 | 12/1983 | Matsuda et al. | |
| 4,489,389 | 12/1984 | Beckwith et al. | 364/731 X |
| 4,575,304 | 3/1986 | Nakagawa et al. | 901/47 X |
| 4,584,704 | 4/1986 | Fellen | 901/47 X |
| 4,613,942 | 9/1986 | Chen | 364/513 |
| 4,615,615 | 10/1986 | Krolak et al. | 901/47 X |
| 4,639,878 | 1/1987 | Day et al. | 901/47 X |
| 4,660,157 | 4/1987 | Beckwith et al. | 364/731 X |
| 4,697,242 | 9/1987 | Holland et al. | 364/513 |
| 4,760,605 | 7/1988 | David et al. | 358/37 X |
| 4,774,678 | 9/1988 | David et al. | 358/11 X |

FOREIGN PATENT DOCUMENTS

| | | |
|---|---|---|
| 268916 | 11/1962 | Australia . |
| 4068164 | 2/1964 | Australia . |
| 3077184 | 7/1984 | Australia . |
| 2956784 | 3/1985 | Australia . |
| 7900189 | 10/1977 | Int'l Pat. Institute . |

OTHER PUBLICATIONS

Gevarter, William B., "An Overview of Computer Vision", U.S. Dept. of Commerce, National Bureau of Standards, publ'n NBSIR 82-2582, Sep. 1982, Appendix H, pp. 118-121.
"Detection of Edges by Videosystems", pp. 9-17, Kreis et al., Proceedings of the 2nd Intl. Conf. on Robot Vision and Sensory Controls, Stuttgart, 1982.
"Using a Laser for Scene Analysis", Connah and Fishbourne, Proc. of the 2nd Intl. Conf. on Robot Vision and Sensory Controls, Stuttgart, 1982, pp. 233-240.
"3D Perception in Industrial Environment"k, Bogaert and Ledoux, 3rd Intl. Conf. on Robot Vision and Sensory Controls, Cambridge, Mass., 1983, pp. 373-380.
"An Optical Proximity Sensor for Measuring Surface Position and Orientation for Robot Manipulation", Kanade and Sommer, 3rd Intl. Conf. on Robot Vision and Sensory Controls, Cambridge, Mass., 1983, pp. 667-673.

Primary Examiner—William M. Shoop, Jr.
Assistant Examiner—Paul Ip
Attorney, Agent, or Firm—Fleit, Jacobson, Cohn, Price, Holman & Stern

[57] ABSTRACT

Robot vision and optical location systems capable of recovery of "depth" information normally lost from the two-dimensional image collected by a conventional image system comprises a radiation source for projecting a beam of light or other suitable radiation from a known location onto a field of vision in a manner that provides information indicating the direction of projection of the beam, a detection device situated at a second known location for receiving light or other radiation of the projected beam, scattered or reflected by objects within the field of vision and providing information indicating the direction of the source of scattered or reflected radiation and an analyzer for comparing the projection location, direction of projection, detection location and direction of the source of detected, scattered or reflected radiation to determine the location of objects in the field of vision.

23 Claims, 3 Drawing Sheets

ROBOT VISION AND OPTICAL LOCATION SYSTEMS

This is a continuation of application Ser. No. 905,164, filed Sept. 9, 1986, now abandoned.

BACKGROUND OF THE INVENTION

1. Field of the Invention

This application relates to an improved object location means for robot vision and optical systems.

2. Description of the Prior Art

Applications for industrial robots are presently restricted to simple repetitive tasks on production and assembly lines where components are delivered to the robot station under tightly controlled conditions. The principle reason for their limitation to such roles is the lack of an efficient and economical general technique to provide them with vision. Considerable effort is now being made in all technologically advanced countries to provide a suitable robot vision system. The commercial implications of a satisfactory system are very considerable and could initiate a new major industry.

To date the only successful attempts at industrial or robot vision systems have been restricted to very simple application systems to locate and orient components on some form of conveyor belt. This type of situation is comparatively easy to handle since the system is tightly constrained to a well regulated two-dimensional object field. Nonetheless, the logic systems required by contemporary designs, even for this simple case, usually need at least a powerful minicomputer.

The more general case of locating and recognizing objects in full three-dimensional space has not yet been solved. All present systems are highly experimental and invariably use main frame or very high powered computers; even with this power, the problem of location cannot be properly solved. Many techniques using outlines, edge detection, shading assessment, color, visual flow fields and the like, have been tried individually and in combination, to reconstruct the three dimensional aspects of an object field seen by a television camera. The inevitable complexity of these techniques defies a good real-time solution even where the most powerful computers now available are used for the analysis.

The central problem in the general case is in the recovery of the "depth" information from the two-dimensional image collected by a conventional camera or image system. The prior art provides no general technique for unambiguous recovery of the information lost irretrievably in the 3D to 2D transformation. The present invention seeks to ameliorate this deficiency in the prior art vision systems.

SUMMARY OF THE INVENTION

According to the present invention there is disclosed:

a projection means situated at a first known location, the projection means being adapted to project a beam of light or other suitable radiation into a field of vision, the beam being characterized by modulation, wavelength or other suitable means such that it provides information indicative of its direction of projection, a detection means situated at a second known location, the detection means being adapted to detect radiation scattered or reflected from the beam by objects in the field, the detection means producing signals indicative of the direction of the scattered or reflected radiation received by the detection means, and an analyzer to receive the signals from the projection means and from the detection means and, based on these signals, to determine, or derive, the location of the objects.

In preferred embodiments of the present invention information regarding the optical distribution of locations thus determined, or derived is stored in an autonomous position-mapped memory as, or in the form of, data relating to the position and apparent brightness of all objects in the field.

This system can be further extended to "look" for objects which have moved by comparing sets of location data on a real-time basis and to generate the spatial co-ordinates and vector velocity components of every moving object. Thus it can provide a continuously updated map of the space and can provide warnings and data about all objects that are moving within the field of vision ion means.

In a first embodiment the light project provides a steerable collimated light beam, the light detection means comprises a light detector array and an imaging lens system. In this embodiment both elements are interfaced with an electronic control system, or a microcomputer. The light beam is systematically scanned back and forth across the object space and the location of the thus illuminated small fraction of the object space is continuously determined or derived at small time increments.

In a second embodiment of the present invention the simple scanning light beam of the first embodiment is replaced by a broad continuous beam composed of various light beam elements of differing character or modulation. In this embodiment the beam is not scanned across the field of vision. Individual small fractions of the field of vision are each illuminated by light of different individual wavelengths or by individually modulated elements of the beam. In this embodiment the detector array of the previous embodiment can be replaced by a single scanning detector.

In a third embodiment a scanning beam is used wherein the modulation of the beam is automatically varied depending on the direction of projection of the beam and each part of the field thus illuminated is detected by a light detector array.

Further embodiments are envisaged using pluralities of the light projection means and directions, pluralities of light detection means and combinations of the types of projection means and detection means other than the combinations described above.

BRIEF DESCRIPTION OF THE DRAWINGS

Features of the present invention will now be described in detail with reference to the accompanying drawings in wherein.

DETAILED DESCRIPTION

Figure 1:
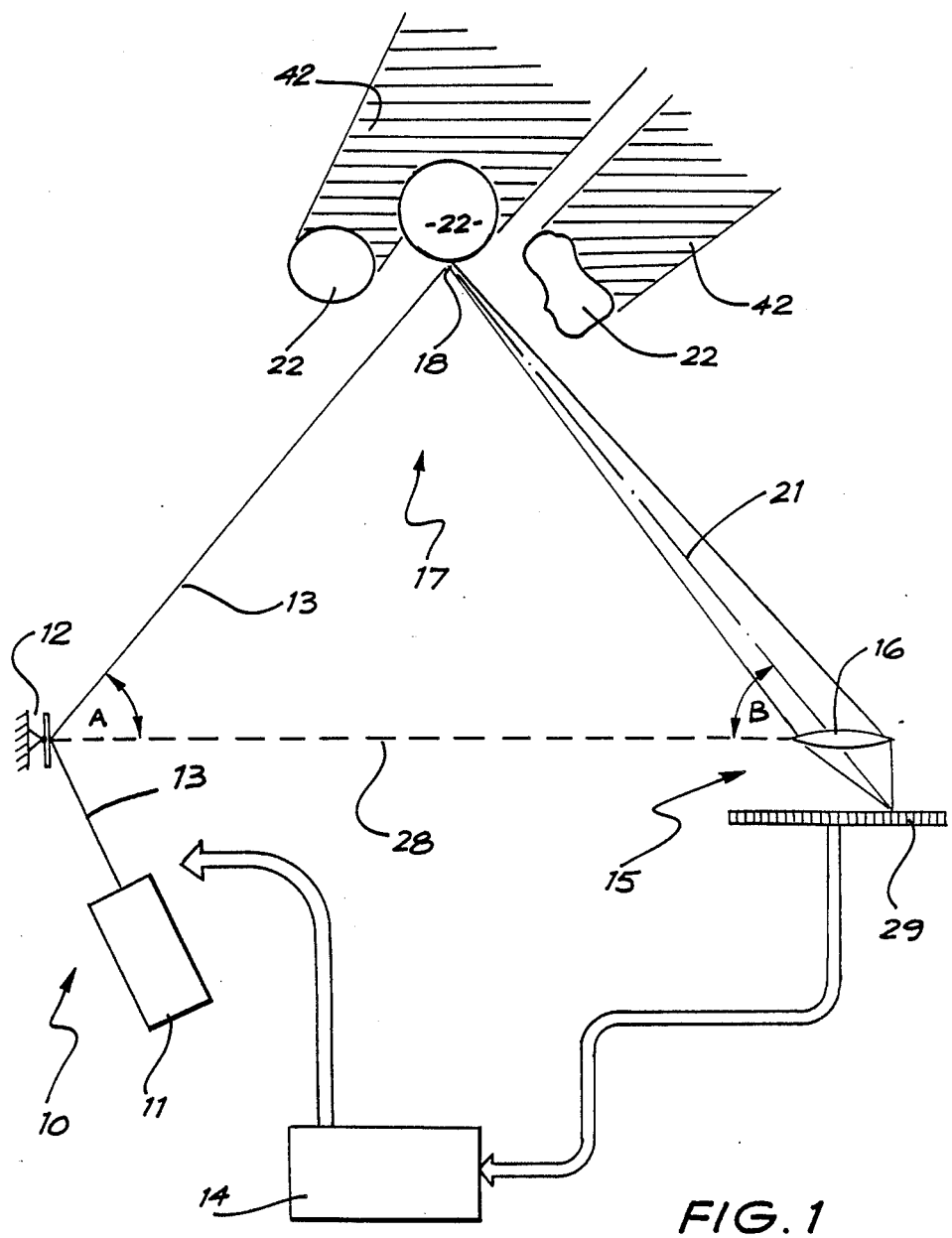
FIG. 1 is a schematic representation of a first embodiment of the present invention in plan view.

Referring to FIG. 1 the embodiment illustrated uses for convenience, a simple low-power laser as a light source 11. The laser beam 13 is directed to a small rotatable mirror 12 whose orientation can be controlled. This allows the laser beam to be scanned across the object field 18.

The light detection means 15 consists of a lens system 16 to collect the laser light scattered by objects 22 in the object space and to image this light onto an array of photosensor elements 29. The detector used for this embodiment is a linear CCD (charge coupled device) comprising integrating photodetectors which can be unloaded on command.

The elements of the system are controlled by an electronic control system, or microcomputer, 14 which operates the scan mirror 12 and unloads the data stream from the light detection means 15. The electronic control system, or microcomputer 14 also processes the data into a matrix defining the position of all objects 22 which reflect light 21 from the laser beam 13. Illumination of objects 22 is achieved by moving the mirror 12 into a known position where the beam is cast at a known angle into the object space 17. If this beam illuminates a small fraction 18 of an object in the field of view, some of the light 21 will be scattered into the lens and will be focussed onto a small region of the detector array cells 29. The angle of the object relative to the light detection means 15 can be easily determined or derived from the image formed on the array 29 and, along with the known projection angle of the light beam, allows the object's position to be fully defined in the object space. Thus, at each mirror position, the co-ordinates of any object illuminated can determined or derived computed and entered into a data array in the memory. After several scans at different laser beam angles, a complete matrix of object co-ordinates can be assembled to any required precision.

If highly reflective objects are present, the a chance that multiple reflections will occur. This can be handled quite easily by higher level analysis of the data matrix within the computer.

Many potential applications of the invention require the system to operate under high levels of ambient light. This can lead to some difficulty in differentiating between the laser illumination and the background light. These situations can be handled directly either by using a laser source and a sharp bandpass filter to block all but the laser light from the detector or alternatively, by the provision of a mechanical or electronic shutter to the illumination source or by using a pulsed laser. If beam modulation is in the form of a chopped or pulsed beam, at each mirror and scan beam position, the beam is allowed to illuminate the object space for a short time; the detector array output is then read and stored in the memory. The beam is then turned off and, after the same amount of time, the detector array output is again read and compared to the previous readings. The difference is due to the intentional illumination with the ambient illumination contribution eliminated.

Referring back to FIG. 1, it can be seen that if the location of the light projection means and light detection means are known, a base line 28 of known orientation between the units can be established. A beam projected in a known direction forms an angle A relative to this base line and scattered light collected by the light detection means indicates the direction of the illuminated fraction 18 of the object space relative to the light detection means at an angle B to the base line.

It is clear that the data provided will allow the location of the illuminated fraction of the object space 18 to be calculated unambiguously using simple triangulation. It should also be realized that this provides the "depth" missing from the prior art using this system.

From the embodiment illustrated FIG. 1, it will be clear that by systematically scanning beam 13 across viewing field 17 and comparing and analyzing data at small time increments to calculate the locations of parts of the viewing field thus illuminated, it is possible using a mini-computer to quickly build up an image of objects 22 located within said field.

The information added to the field by controlling its illumination allows an extra dimension of information to be collected to that provided by the detector array used. This is to say a simple two dimensional plan or map can be provided using a one dimensional detector array and a complex three dimensional model can be developed using a two dimensional array.

The shape of objects can be reconstructed in this manner, and their identity and orientation can therefore be established. For many objects, the albedo of the surface and its change with orientation, can be used to discriminate between similar shaped objects. Since the range and orientation of the objects can be discerned unambiguously by the system, the apparent brightness of the object can be assessed and used for identification of objects or for resolution of apparent ambiguities.

Furthermore, suitable software in the control system can detect if some areas of the object space cannot be properly resolved. If the electronic control system, or computer can control the beam's position as well as its angle, the scanning illumination beam can be limited to suitable portions of the object field to resolve any ambiguities.

Two variations on the embodiment of FIG. 1 exist. Light may be projected as a small spot of light and scanned across the object space in a simple raster scan, as is well known in the illumination of the cathode ray tube of a television set or a beam may be projected in a thin band and swept across the field of vision.

As only the angles A and B relative to a known base line are required to calculate depth of field and data regarding horizontal and vertical co-ordinates can be provided by the light detection means, the location of a fraction of the object space illuminated by the latter variation, which may comprise a series of co-ordinates, can also be unambiguously calculated.

Figure 2:
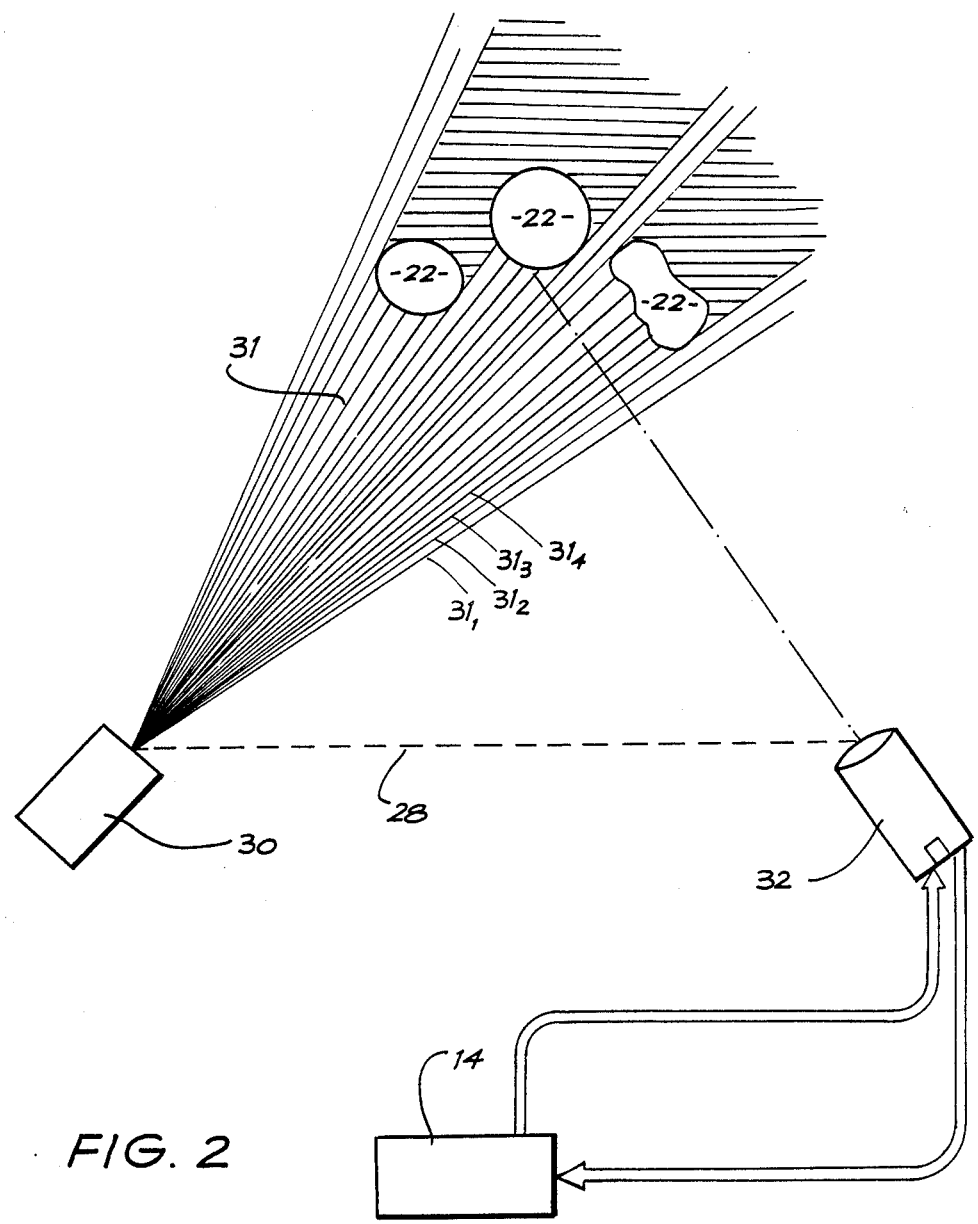
FIG. 2 is a schematic representation of a second embodiment of the present invention.

In a second embodiment, illustrated in FIG. 2, the scanning beam projector of the first embodiment is replaced by a projection means 30 adapted to project a broad light beam 31 wherein said beam is further comprised of component element beams $31_1, 31_2, 31_3 \ldots 31_n$ of known and differing modulation or wavelength.

The photoelectric array of the first embodiment is replaced by a single scanning detector, 32, under the control of the electronic control system, or computer 14 then, as the detector is scanned across the illuminated field, the coded characteristic of the light detected at each point defines the direction of the illumination beam causing that scattered light and hence locates the object co-ordinates unambiguously.

A considerable advantage of this system is that the detector can scan the whole field quickly at low resolution, but by adjusting its scan range, a small region of the field can be studied at high resolution. Furthermore, the computer need not be interfaced with the electronic control system, or projection means, it need only have information regarding the modulation pattern.

In a further modification, the illumination beam is scanned as in the first embodiment, but at each incremental scan direction, it is modulated with wavelength, frequency or pulse coded information which specifies its instantaneous direction. This again eliminates the need for the electronic control system, or computer to control the light projection means, since the light projection means provides its own coded direction information. The computer software must however be more complex since it needs to locate the reflected light direction and its modulation at each point. Many techniques are known in the art for handling this modulation detection.

Figure 3:
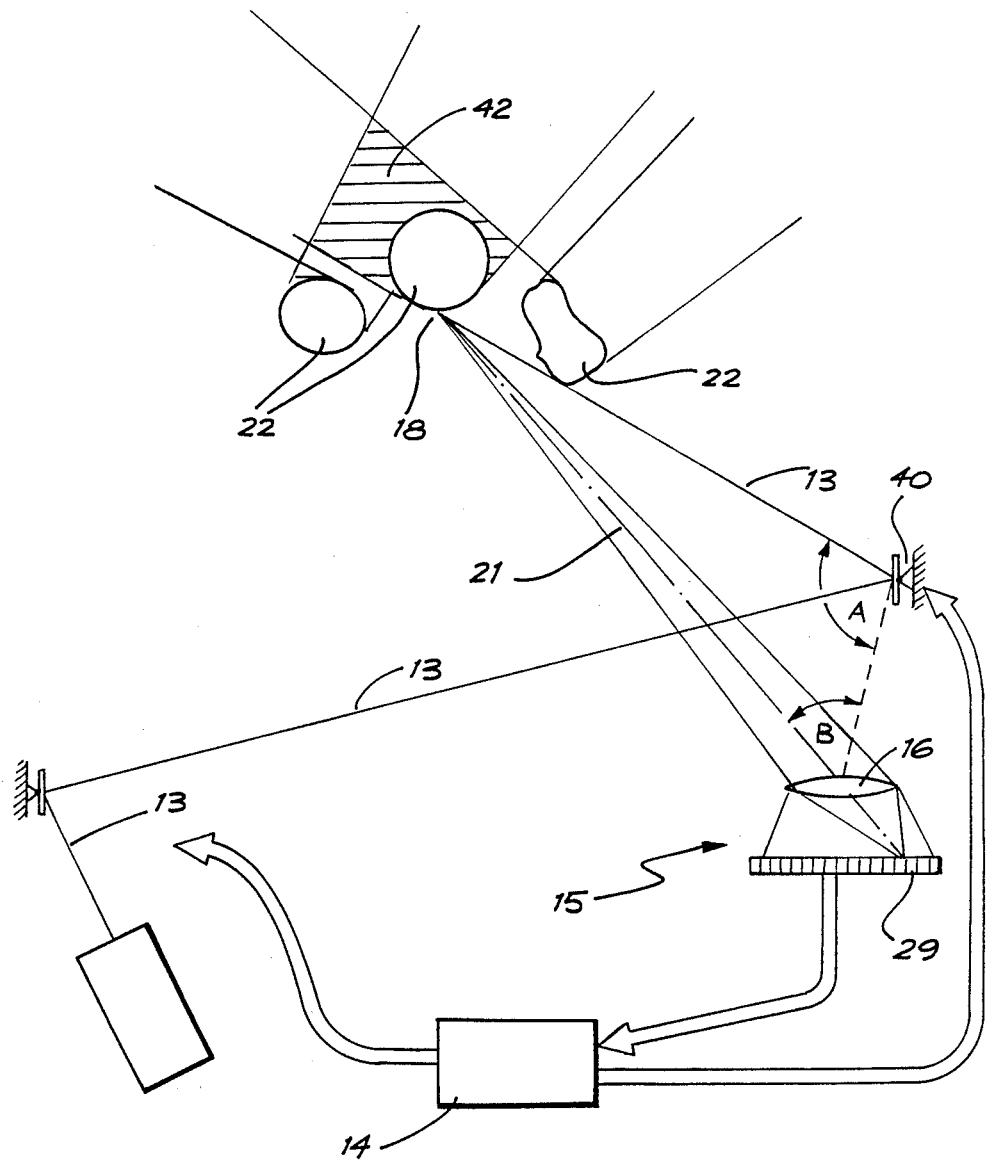
FIG. 3 is a view similar to FIG. 1 showing the object space illuminated from more than one position.

Reference to FIG. 3 shows how the system depicted in FIG. 1 can be modified by projecting the illuminating light beam from more than one position, In the schematic illustration of FIG. 3 light beam 13 is projected to a secondary steerable mirror 40 at a second known location and then scanned across said object space in the previously described manner. By combining data gained from scanning the viewing field from the second position with that gained from scanning the viewing field from the first position the shadow region 42 which is not illuminated is greatly reduced, giving potential for increased information about the field.

A similar variation can be adopted for the embodiment illustrated in FIG. 2, in that more than one projection means may be used.

Furthermore, it should be realized that scope exists to employ a plurality of field projection means and a plurality of light detection means simultaneously.

Such combinations would allow a remote light beam source to illuminate a large area for multiple detector systems with a single code-modulated, scanning beam. For example, a plurality of single, very sensitive high gain scanning detectors located at individual receiver locations would allow very faint signals scattered from distant objects to be detected, modulation detection would provide the instantaneous illumination beam position to be decoded. Such a system, with double scanning, would be fairly slow but would provide a very economical solution for long range object sensing. The provision of several illumination beams with different modulation patterns would allow a detector station to select that beam which gave the best information of the object field.

It will be appreciated that numerous combinations, variations, modifications or alternatives may be substituted for specifically described features without departing from the spirit or scope of the present invention as herein described.

I claim:

1. An object location system for generating a three-dimensional map of the visible surfaces of objects disposed within a predefined field of view comprising:
   projection means situated at a first known location for projecting a beam of radiation into the field of view and periodically scanning said beam over the entire field of view;
   encoding means for continuously encoding said beam of radiation with information indicative of its instantaneous direction of projection;
   detection means situated at a second known location spaced apart from said first known location for monitoring the field of view to detect radiation from said beam scattered or reflected from surfaces of the objects in said field and producing detection signals indicative of the directions from which said scattered or reflected radiation is received by said detection means;
   decoding means connected to said detection means and responsive to the encoding carried on the projected beam direction;
   map storage means comprising an array of memory elements representing a map of the field of view having one more dimension than that of said detection means; and
   map generating means responsive to successive detected signals and decoded signals to store information in respective memory array elements to model the location in said field of view of detected points on the surfaces of the objects located therein.

2. A system as claimed in claim 1 wherein:
   said projecting means comprises a aster scanning means for scanning said beam systematically across said field of view; and
   said detection means comprises a two-dimensional detector array means so that the system produces a three-dimensional map of the field of view.

3. A system as claimed in claim 1 wherein:
   said projection means comprises means for scanning said beam across the field of view in one plane; and
   said detection means comprises a one-dimensional detector array means so that the system produces a two-dimensional map of the field of view.

4. A system as claimed in claim 1 wherein said projection means comprises:
   a plurality of projection means, each situated at different known locations for projecting beams of known encoding into said field so that a plurality of maps of the field of view are produced, each representing a viewpoint corresponding to a respective one of the projection means whereby surfaces hidden from one projection means will be scanned by another of the plurality of projection means.

5. A system as claimed in claim 1 and further comprising an analyzer means comprising:
   means for comparing and analyzing the contents of said map storage on a real time basis and for generating spatial co-ordinates and vector velocities for objects moving within said field.

6. A system as claimed in claim 1 and further comprising cancellation means for minimizing background illumination effects on said detection means comprising:
   modulation means for modulating said beam in time with a predetermined modulation signal; and
   filter means to remove from said detection signal any components which are not modulated with said modulation signal.

7. A system as claimed in claim 1 and further comprising cancellation means for minimizing background illumination effects on said detection means, comprising:
   means for modulating said beam in time said beam being continuously turned on and off for like periods and;
   signal subtraction means whereby detection signals received for a given point in the field of view during a period when the projected beam is off is subtracted from the respective signal received when the beam is on.

8. An object location and surface mapping system comprising:
   projection means situated at a first known location for projecting a beam of radiation into a target area, for scanning the target area with said beam and for producing signals indicative of the instantaneous direction of the projected beam;

detection means situated at a second known location spaced apart from said first location for detecting radiation scattered or reflected from said beam by objects in said target area, and for producing signals indicative of the directions from which said scattered or reflected radiation is received by said detection means; and map generating means for receiving said signals from said detection means indicative of the directions from which scattered or reflected light is received and said signals from said projection means indicative of the instantaneous direction of said projected beam and in response to said signals building a map having one more dimension than said detection means of surfaces of all visible objects within the target area from which scattered or reflected radiation is detected and determining the location of said objects using said map.

9. A system as claimed in claim 8 wherein:

said projecting means comprises a raster scanning means for scanning said beam systematically across said target area; and said detection means comprises a two-dimensional detector array means so that the system produces a three-dimensional map of the target area.

10. A system as claimed in claim 8 wherein:

said projection means comprises means for scanning said beam across the field of view in one plane; and said detection means comprises a one-dimensional detector array means so that the system produces a two-dimensional map of the target area.

11. A system as claimed in claim 8 wherein:

said projection means is controlled by said map generating means.

12. A system as claimed in claim 8 wherein said projection means comprises:

means for automatically scanning said target area and providing signals indicative of said direction of projection of said beam to said map generating means.

13. A system as claimed in 8 wherein said map generating means comprises:

means for comparing and analyzing the contents of said map generating means on a real time basis and for generating spatial co-ordinates and vector velocities for objects moving within said field.

14. A system as claimed in claim 8 wherein said projection means comprises:

means for modulating said beam in time, the beam being continuously turned on and off for like periods; and signal subtraction means whereby a detection signal received for a given point in the target area during a period when the projected beam is off is subtracted from the respective signal received when the beam is on.

15. A method of locating objects and mapping the shape of surfaces in a target area comprising the steps of:

(a) projecting a beam of radiation into the target area in a known direction from a first known location for producing scattered or reflected radiation from objects or surfaces in the target area;

(b) detecting said scattered or reflected radiation at a second known location and determining the direction from which said scattered or reflected radiation is received;

(c) determining the co-ordinates of said objects or surfaces within the target area from which said projected radiation was scattered or reflect by performing calculations on said known direction of projection and said determined direction from which said scattered or reflected radiation is received; and (d) systematically altering the angle of projection of said beam until the whole target area has been scanned by said beam and at the same time building a map of the surfaces detected in the target area from the respective calculated co-ordinates.

16. A method of locating objects and mapping the three dimensional shape of all object surfaces visible in a target area comprising the steps of:

(a) simultaneously illuminating the entire target area by projecting a plurality of discrete beams of radiation into the target area from a known location so that each beam illuminates a fraction of the target area with each fraction of the target area being illuminated by only one of the beams, whereby scattered or reflected radiation is produced from objects or surfaces in the target area;

(b) encoding each beam by modulation with information indicative of is respective direction of projection;

(c) detecting elements of said scattered or reflected radiation at a second known location and determining the direction from which each element of said scattered or reflected radiation is received;

(d) decoding the encoded beam direction information carried by each received element of the scattered or reflected radiation to determine the original direction of projection of the beam from which that element originated;

(e) correlating said information carried by said detected radiation relating to projected beam directions with the directions from which respective scattered or reflected radiation is received; and f) deriving a series of surface co-ordinates from which a map can be constructed of the surfaces in the target area from which the scattered or reflected radiation from the beam has been detected.

17. An object location system for mapping surfaces of objects disposed within a predefined field of view comprising:

projection means situated at a first known location for projecting a plurality of beams of radiation into the field of view, each beam illuminating a fraction of the field so that every point in the field is directly illuminated by only one beam;

encoding means for encoding each beam of radiation with information indicative of its direction of projection;

detection means situated at a second known location spaced apart from said first known location for monitoring the field of view to detect radiation from said beams scattered or reflected from surfaces of the objects in said field and producing detection signals indicative of the directions from which said scattered or reflected radiation is received by said detection means;

decoding means connected to said detection means and responsive to the encoding carried on each projected beam for producing decoded signals indicative of each projected beam direction;

map storage means comprising an array of memory elements representing a map of the field of view; and map generating means responsive to successive detected signals and decoded signals to store information in respective memory elements to model the location in said field of view of detected points on the surfaces of the objects located therein.

18. A system as claimed in claim 17 and further comprising an analyzer means comprising:

means for comparing and analyzing the contents of said map storage means on a real time basis and for generating spatial co-ordinate and detector velocities for objects moving within said field.

19. A system as claimed in claim 17 wherein:

said detection means comprises a two-dimensional detector array means so that the system produces a three-dimensional map of the field of view.

20. A system as claimed in claim 17 wherein:

said detection means comprises a one dimensional detector array means so that the system produces a two dimensional map of the field of view.

21. A system as claimed in claim 17 wherein said projection means comprises:

a plurality of projection means, each situated at different known locations for projecting beams of known encoding into said field of view so that a plurality of maps of the field of view are produced, each representing a viewpoint corresponding to a respective one of said projection means whereby surfaces hidden from one projection means will be scanned by another of the plurality of projection means.

22. A system as claimed in claim 17 and further comprising cancellation means for minimizing background illumination effects on detection means comprising:

modulation means for modulating each beam in time with a predetermined terminal modulation signal; and filter means to remove from the detection signal any components which are not modulated with said modulation signal.

23. A system as claimed in claim 17 and further comprising cancellation means minimizing background illumination effects on said detection means comprising:

means for modulating each beam in time so that each beam is continuously turned on and off for like periods.

* * * * *